Figure 1:
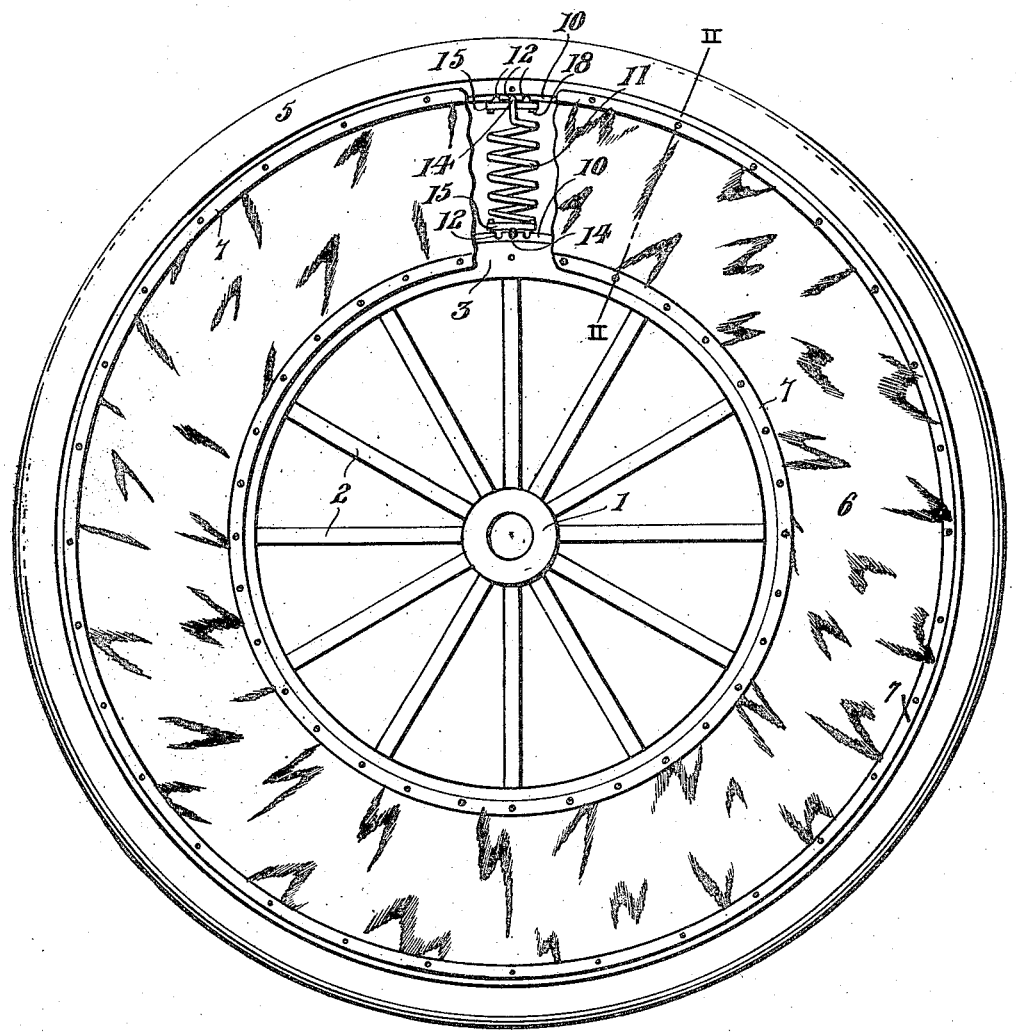

W. PIERNIKOWSKI AND S. GRUDZINSKI.
SPRING WHEEL.
APPLICATION FILED MAR. 8, 1922.

1,423,733.

Patented July 25, 1922.

2 SHEETS—SHEET 2.

Inventors
W. Piernikowski
S. Grudzinski

By J. K. Bryant,
Attorney

UNITED STATES PATENT OFFICE.

WLADYSLAW PIERNIKOWSKI AND STANISLAW GRUDZINSKI, OF PHILADELPHIA, PENNSYLVANIA.

SPRING WHEEL.

1,423,733.   Specification of Letters Patent.   Patented July 25, 1922.

Application filed March 8, 1922. Serial No. 542,035.

*To all whom it may concern:*

Be it known that we, (1) WLADYSLAW PIERNIKOWSKI and (2) STANISLAW GRUDZINSKI, (1) a citizen of Poland and (2) a citizen of the United States of America, residing at Philadelphia, in the county of Philadelphia and State of Pennsylvania, have invented certain new and useful Improvements in Spring Wheels, of which the following is a specification.

This invention relates to certain new and useful improvements in spring wheels and has particular reference to a spring wheel operating in the absence of the usual pneumatic tire and adapted for use in connection with automobiles or other motor vehicles.

The primary object of the invention resides in the provision of a spring wheel having an annular rim or band, supporting a solid cushion tire and enclosing and spaced from the felly of a spoke wheel with metallic springs interposed between the felly and band.

A further object of the invention has reference to a spring wheel wherein metallic coil springs are interposed between the felly of the wheel and an enclosing rim member, the ends of the springs being secured to said felly and rim for a direct radial mounting, or for mounting at an incline to the radius of the wheel.

With the above general objects in view the invention consists of the novel combination and arrangement of parts hereinafter more fully described in connection with accompanying drawings, and in which like reference characters designate corresponding parts throughout the several views.

The drawings:—

Figure 2:
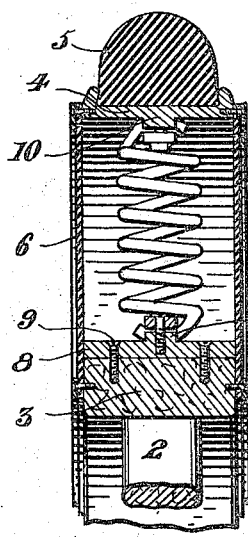
Figure 4:
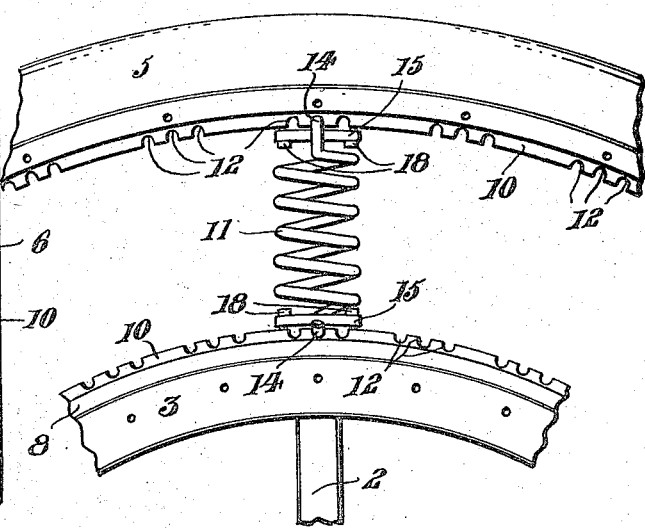
Figure 3:
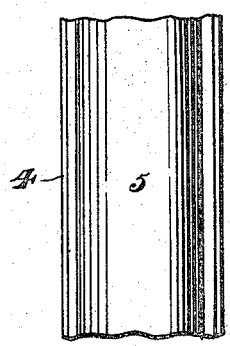
Figure 5:
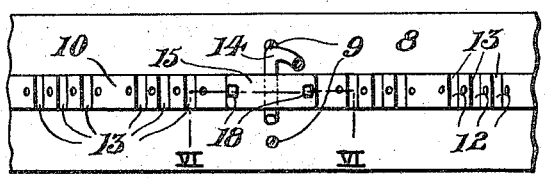
Figure 6:
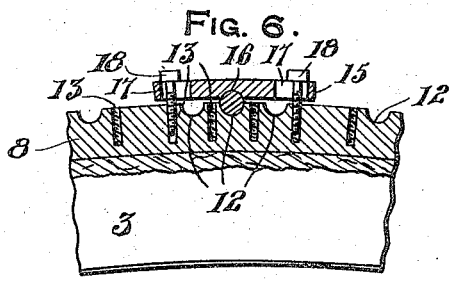
Figure 7:
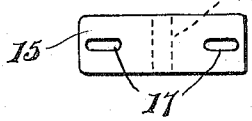

Figure 1 is a side elevational view partly broken away of a spring wheel constructed in accordance with the present invention, showing one of the springs extending between the wheel felly and the enclosing rim and the flexible side sheet connected to the felly and rim, Figure 2 is a cross sectional view taken on line II—II of Figure 1 showing a solid cushion tire supported on the enclosing rim, and the anchoring of the ends of the spring to the wheel felly and rim, Figure 3 is a fragmentary plan view of the wheel tread, Figure 4 is a fragmentary side elevational view of the wheel with the flexible side sheets removed showing the spring receiving grooves in the adjacent faces of the wheel felly and rim, Figure 5 is a fragmentary plan view of a wheel felly showing the block for anchoring the inner end of the spring thereto, Figure 6 is a detail sectional view taken on line VI—VI of Figure 5 showing the end of the spring anchored to the wheel felly by a screw retained block, Figure 7 is a top plan view of the spring anchoring block.

Referring more in detail to the accompanying drawings, and particularly to Figures 1 and 2 there is illustrated a spring wheel having a hub portion 1 carrying radial spokes 2 with a wheel felly 3 carried by the outer ends of the spokes. An annular band or rim encloses the felly 3 and is spaced therefrom by spring devices to be later described, the rim 4 supporting the solid cushion tire 5, flexible side sheets 6 formed of rubber or fabric providing a closure at the opposite sides of the felly 3 and rim 4, the flexible sheets 6 being secured to the rim and felly by ring members 7 as clearly shown in Figures 1 and 2.

The felly band 8 is secured as at 9 to the felly 3 and the opposed faces of the rim 4 and the band 8, each carry a circumferentially extending rib 10, the opposed faces of said ribs being similarly constructed for anchoring the opposite ends of the coil springs 11 thereto. The construction of the rib faces is more clearly shown in Figures 5 and 6, the mounting for each end of the spring including the provision of spaced sets of transversely extending and adjacently positioned grooves 12, and an internally threaded screw receiving socket 13 at each side of the grooves. Coil springs 11 have angularly bent ends 14 that are received in one of the grooves 12 of each rib 10, the spring ends 14 being retained in the grooves by the clamping blocks 15 each having a transverse groove 16 in one of the faces thereof that receives the spring ends 14, the opposite faces of the clamping blocks 15 being provided with elongated slots 17 for the reception of screw bolts 18 freely extending therethrough and received in the threaded sockets 13 of each rib 10.

From the above detailed description of the device, it is believed that the construction and operation thereof will at once be apparent, it being noted that the spring arms 14 may be positioned in either one of the sets of three grooves 12 and rigidly mounted relative to the rim 4 and felly band 8 by the anchoring blocks 15, the screw bolts passing through the slotted openings 17 in said anchoring blocks received in the adjacent threaded sockets 13. The cushion springs 11 may be positioned directly radially of the wheel, or the outer ends thereof may be circumferentially shifted to present the spring arms 14 for mounting in the desired grooves 12 as the occasion may require. The flexible side sheets 6 protect the springs from contact with objects and also prevent the collection of dirt or other foreign matter between the felly 3 and the rim.

While there is herein shown and described the preferred embodiment of my invention, it is to be understood that minor changes in the construction, combination and arrangement of parts may be made without departing from the spirit and scope of the invention.

Having thus described the invention, what we claim as new is:—

1. In a spring wheel of the type described, a spoke supported felly, a band secured to the felly, a rim surrounding the felly and spaced therefrom, a solid cushion tire carried by the rim, cushion springs interposed between the felly band and rim, and adjustable anchoring means for the opposite ends of the springs.

2. In a spring wheel of the type described, a spoke supported felly, a band secured to the felly, a rim surrounding the felly and spaced therefrom, a solid cushion tire carried by the rim, cushion springs interposed between the felly band and rim, opposed ribs carried by the felly band and rim and extending circumferentially of the wheel, and adjustable anchoring means for the opposite ends of the springs carried by said ribs.

3. In a spring wheel of the type described, a spoke supported felly, a band secured to the felly, a rim surrounding the felly and spaced therefrom, a solid cushion tire carried by the rim, cushion springs interposed between the felly band and rim, opposed ribs carried by the felly band and rim and extending circumferentially of the wheel, the faces of said ribs having sets of spaced transverse grooves formed therein, anchoring arms carried by the opposite ends of each spring positioned in one of said grooves and a clamping block overlying each arm and secured to the rib.

4. In a spring wheel of the type described, a spoke supported felly, a band secured to the felly, a rim surrounding the felly and spaced therefrom, flexible side sheets extending between the felly and rim, opposed circumferentially extending ribs formed on the felly band and rim, said ribs having spaced sets of transverse grooves formed therein, coil springs interposed between the felly band and rim and each carrying at opposite ends an angle arm positioned in an adjacent groove and a clamping block having a groove formed in the inner face thereof receiving the adjacent spring angle arm and anchored to the adjacent rib.

In testimony whereof we affix our signatures.

WLADYSLAW PIERNIKOWSKI.
STANISLAW GRUDZINSKI.